Oct. 13, 1931.  S. A. GILES  1,827,467
APPARATUS FOR RECOVERING GOLD AND SILVER
Filed Nov. 26, 1929
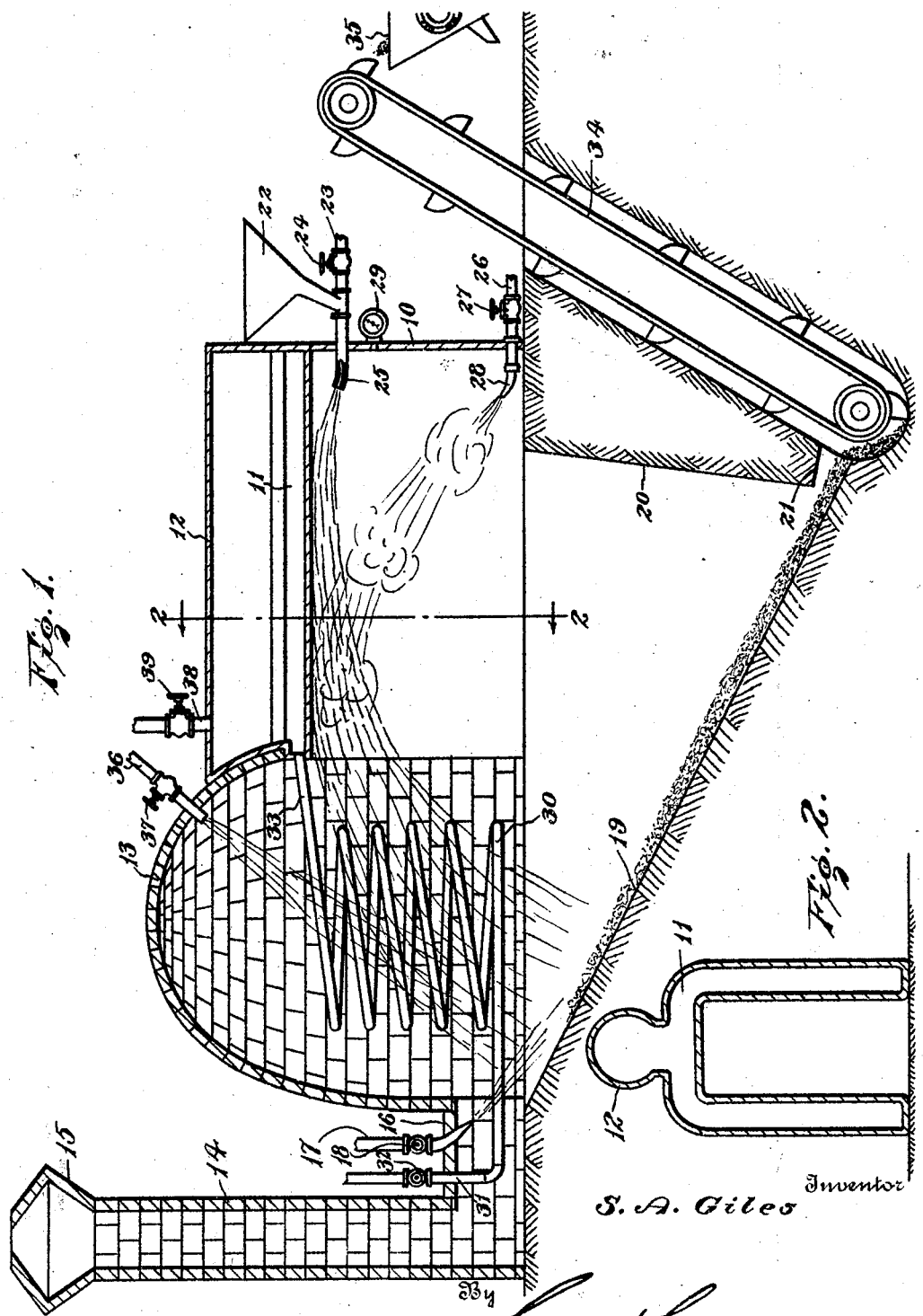

Patented Oct. 13, 1931

1,827,467

UNITED STATES PATENT OFFICE

STELLE A. GILES, OF HUTCHINSON, KANSAS

APPARATUS FOR RECOVERING GOLD AND SILVER

Application filed November 26, 1929. Serial No. 409,928.

This invention relates to apparatus adapted more particularly for use in carrying out the method of recovering gold and silver from low grade ores as described in my application filed November 22, 1929, Serial No. 409,126.

An object of the present invention is to provide apparatus which will be simple and inexpensive to manufacture and will be so constructed that low grade ores such as shales may be treated to remove limiting elements that prevent ordinary methods of recovery of gold and silver being effective.

A further object of the invention is to provide an apparatus in which the limiting elements are removed by oxidation and the gangue of waste matter in which the colloidal gold is sealed, will be loosened and cracked to free the gold, the apparatus being so constructed that the temperature may be carefully controlled so as to prevent resealing of the free gold.

A further object of the invention is to provide an apparatus of this kind in which the stream of heated pulverized shale or the like gravitates through cooling coils which cool and chill the material so as to positively prevent the formation of slag or the fluxing of the material which would reseal the gold.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of the specification,

Figure 1 is a longitudinal sectional view through the apparatus with parts in elevation, and Figure 2 is a cross-sectional view on the line 2—2 of Figure 1.

Referring now to the drawings in which like characters of reference designate similar parts, the apparatus is shown to comprise an oxidizing chamber 10 which is preferably formed of steel and is surrounded by a water jacket 11, a steam dome 12 being in communication with the water jacket as shown.

Communicating with the oxidizing chamber 10 is a reducing chamber 13 preferably constructed of brick and having an outlet stack 14 which is equipped with a dust collector 15 to permit the recovery of escaping particles. The stack is provided with a horizontal portion 16 into which a spray of water is admitted through a pipe 17 controlled by a valve 18. Ordinarily, this spray of water serves to recover escaping particles but where sulphur and arsenic are present in the material the spray is dispensed with and the dust collector 15 relied upon.

The bottom 19 of the apparatus slopes from the horizontal portion 16 of the stack forwardly at an angle such that the material will flow downwardly towards the front end of the apparatus. The front wall 20 is disposed at an angle of about 80° so that material gravitating from this wall into the collection pit formed by this wall and the bottom 19 will drop quickly to the lowest portion or outlet 21 of the pit.

The hopper 22 for the finely ground or pulverized shale or like material which is to be treated, is mounted at the front or charging end of the apparatus and discharges its contents into an air blast pipe 23 which is controlled by a valve 24 and terminates in an upwardly directed nozzle 25 that serves to cause the finely pulverized material to be directed upwardly in an arched stream through the oxidizing chamber 10 and into the reducing chamber 13. The material from the pulverized arch stream gravitates to the collection pit floor 19 and while dropping is subjected to an oxidizing flame as will now be described.

A fuel pipe 26 is conducted into the furnace, the fuel preferably being oil, gas, pulverized coal or any other desired fuel. The fuel pipe is controlled by a valve 27 and is equipped with an upwardly directed nozzle 28 which causes the flame to arch upwardly and meet the stream of finely pulverized material and heat the latter during its passage through the oxidizing chamber 10 and reducing chamber 13. The oxygen of the air blast from the pipe 23 supplies an excess of oxygen in the chamber 10 so that the flame becomes an oxidizing flame and consumes the gaseous limiting elements in the finely pulverized shale for example, such elements being carbon, sulphur, arsenic, phosphorus and the like.

A temperature gage 29 is mounted on the wall of the oxidizing chamber as shown so that the temperature may be watched as it is highly detrimental to allow the temperature to rise above 960° centigrade during the heating of the material. It will be understood that by manipulation of the valve 27 the fuel supply may be controlled to control the temperature or the same result may be accomplished by manipulation of the valve 24 to cause a greater or lesser amount of the pulverized material to be blown into the chamber 10.

Arranged in the reducing chamber 13 is a water coil 30, one coil being shown for the purpose of illustration, but it is to be understood that any number of these coils may be employed. The cooling coil is sufficient in extent to reach from the bottom of the chamber where it is fed through an inlet pipe 31 controlled by a valve 32, to approximately the dome of the chamber as shown, where it enters the water jacket 11 through an outlet pipe 33. The gravitating material from the arched stream of finely pulverized material drops through the water coil which chills and cools the particles sufficiently to prevent formation of slag with consequent resealing of the gold when the material accumulates on the bottom 19 of the apparatus.

An endless conveyor 34 is arranged with its lower end projecting into the collection pit at the lowest point thereof, so that the material will be collected by the conveyor and carried upwardly to a hopper 35 in which the material is reground in carrying out the final step of preparing the material for the recovery of the colloidal gold therein.

In order that the reducing chamber 13 may be supplied with an excess of oxygen so as to effect complete removal of carbon from the material, an air inlet pipe 36 is conducted into the chamber 13 and is controlled by a valve 37.

It will here be noted that the purpose of the water jacket 11 is to assist in maintaining a uniform temperature in the oxidizing chamber 10 as otherwise this chamber might become so hot as to cause the material to flux or form slag which would be highly detrimental to the proper preparation of the material for subsequent treatment. Furthermore, the steam dome 12 is provided with an outlet pipe 38 which is controlled by a valve 39 and permits of the surplus heat being utilized in the production of steam for the operation of any desired machinery.

Having thus described the invention, I claim:

1. An apparatus of the class described comprising an oxidizing chamber, a reducing chamber communicating with the oxidizing chamber, a stack having a horizontal portion venting the reducing chamber, a collection pit beneath and communicating with both of said chambers and having a downwardly sloping bottom extending from said horizontal portion of the stack to nearly the front end of said oxidizing chamber, a water spray pipe entering said horizontal portion of the stack, substantially at the upper end of said inclined bottom, a fuel supply pipe entering said oxidizing chamber, and a pipe for supplying finely ground material under air pressure to said oxidizing chamber 2. An apparatus of the class described comprising an oxidizing chamber, a reducing chamber communicating with the oxidizing chamber, a stack having a horizontal portion venting the reducing chamber, a collection pit beneath and communicating with both of said chambers and having a downwardly sloping bottom extending from said horizontal portion of the stack to substantially the front end of said oxidizing chamber, a water spray pipe entering said horizontal portion of the stack substantially at the upper end of said inclined bottom, a cooling coil disposed in said reducing chamber, a fuel supply pipe entering said oxidizing chamber, and a pipe for supplying finely ground material under air pressure to said oxidizing chamber.

In testimony whereof I affix my signature.

STELLE A. GILES. [L. S.]